United States Patent Office 3,845,089
Patented Oct. 29, 1974

3,845,089
PHENYLHEPTADIENOATES
Clive A. Henrick, Palo Alto, Calif., assignor to Zoecon Corporation, Palo Alto, Calif.
No Drawing. Filed July 27, 1972, Ser. No. 275,646
Int. Cl. C07c *69/76;* A01n *9/24*
U.S. Cl. 260—410.9 R            5 Claims

ABSTRACT OF THE DISCLOSURE

Substituted phenyl-heptadienoates and derivatives thereof, intermediates therefrom, synthesis thereof, and the control of insects.

---

This invention refers to novel phenyl derivatives useful for the control of insect pests. More particularly, the novel compounds of the present invention are represented by the following formula (A):

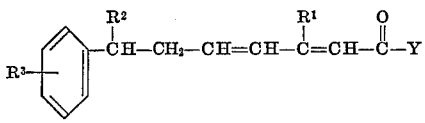

(A)

wherein, each of $R^1$ and $R^2$ is lower alkyl;
$R^3$ is lower alkyl, chloro, the group —OR or the group —SR in which R is hydrogen or lower alkyl; and
Y is the group —OR in which R is hydrogen or lower alkyl.

The compounds of formula A are useful for the control of insects. The utility of these compounds as insect control agents is believed to be attributable to their juvenile hormone activity. They are preferably applied to the immature insect, namely, during the embryo, larvae or pupae stages in view of their effect on metamorphosis and otherwise causing abnormal development leading to death or to inability to reproduce. These compounds are effective control agents for Heteropterans, such as Lygaeidae, Miridae and Pyrrhocoridae; Homopterans, such as Aphididae, Coccidae and Jassidae; Lepidopterans, such as Pyralidae, Noctuidae and Gelechiidae; Coleopterans, such as Tenebrionidae, Crysomelidae and Dermestidae; Dipterans, such as Culicidae, Muscidae and Sarcophagidae; and other insects. The compounds can be applied at low dosage levels of the order of 0.01 μg. to 10 μg. per insect. Suitable carrier substances include liquid or solid inert carriers, such as water, acetone, xylene, mineral or vegetable oils, talc, vermiculite, natural and synthetic resins and silica. Treatment of insects in accordance with the present invention can be accomplished by spraying, dusting or otherwise contacting the insect, directly or indirectly, with one or more compounds of formula A. Generally, a concentration of less than 25% of the active compound is employed. The formulations can include insect attractants, emulsifying agents or wetting agents to assist in the application and effectiveness of the active ingredient.

In the description hereinafter, each of R-R³ and Y is as defined above unless otherwise specified.

Carboxylic esters of formula A (Y is —OR in which R≠hydrogen) can be prepared via the process outlined below:

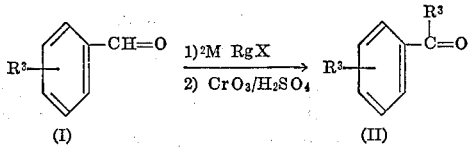

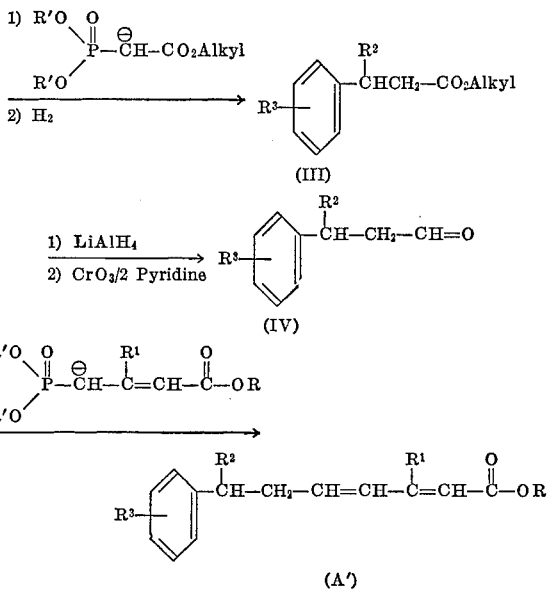

In the above formulas, X is chloro or bromo; $R'$ is lower alkyl, cycloalkyl or phenyl, and R≠hydrogen. $R^3$ can be in any position of the phenyl ring, that is, ortho, meta or para, the meta and para positions being the preferred ones.

In the above outlined synthesis, a substituted benzaldehyde of formula I is converted by a Grignard reaction with a lower alkyl magnesium chloride or bromide followed by Jones oxidation with chromic acid/sulfuric acid/water in acetone, into the substituted benzo-ketone II which, upon condensation with the anion of a dialkyl alkoxycarbonylmethyl phosphonate, and catalytic hydrogenation of the thus-produced unsaturated ester with hydrogen in the presence of 10% palladium-on-charcoal, gives III. The ester group of III is reduced to the primary alcohol with lithium aluminum hydride in ethyl ether, and then oxidized to the aldehyde with chromium trioxide-pyridine complex in methylene dichloride to yield a compound of formula IV. Conversion of IV into A' is achieved by condensation with the anion of a trialkyl 4-phosphono-3-lower alkyl-2-butenoate.

The phosphonate anions are generated by treatment of the corresponding phosphonate with a base such as sodium hydroxide, sodium methoxide, sodium ethoxide, sodium hydride or similar, in an organic solvent inert to the reaction such as dimethylformamide, benzene, tetrahydrofuran and the like. For preparation of phosphonate reagents and their reaction with carbonyl compounds see Wadsworth and Emmons, *Org. Synth.* 45, 44 (1965); Pattenden and Weedon, *J. Chem. Soc.* (C), 1984 and 1997 (1968); and Stilz and Pommer, U.S. Pats. 3,163,669 and 3,177,226.

The starting material mono-substituted benzaldehydes of formula I are readily and commercially available products.

In the cases where $R^2$ is methyl, the synthesis can be started directly from any of the monosubstituted acetophenones (II: $R^2$ is methyl) which are available in the market, thus avoiding the first two steps indicated in the above scheme of the process.

The esters of formula A' are converted into the corresponding acid by hydrolysis with base such as potassium carbonate, sodium carbonate, sodium hydroxide, and the like, in an organic solvent such as methanol or ethanol. Other esters of the present invention can be prepared by trans-esterification or conversion of the acid into the acid halide by treatment with thionyl chloride or bromide, oxalyl chloride or bromide, phosphorous pentabromide, or the like, in an organic solvent inert to the reaction such as benzene, ether or similar solvents, and then reacting the acid halide with the alcohol corresponding to the ester moiety desired.

The term "lower alkyl," as used herein, refers to a straight or branched chain saturated aliphatic hydrocarbon group having a chain length of one to six carbon atoms, e.g., methyl, ethyl, propyl, i-propyl, n-butyl s-butyl, t-butyl, pentyl and hexyl.

The following examples are provided to illustrate the practice of the present invention. Temperature is given in degrees centigrade.

EXAMPLE 1

To 15.25 g. of trimethylphosphonoacetate (dimethyl methoxycarbonylmethylphosphonate) in 50 ml. of dry dimethylformamide, stirring under nitrogen at 0°, is added 5.34 g. of sodium methoxide in small portions. When addition is complete, 12.36 g. of p-isopropylacetophenone in 50 ml. of dry dimethylformamide is added dropwise over a period of 15 minutes. The reaction mixture is stirred overnight at room temperature and then heated to reflux for 3 days and allowed to cool to room temperature. The mixture is poured into ice-water and extracted with hexane. The combined organic layers are washed with water and brine, dried over calcium sulfate and evaporated in vacuo. The product is purified by distillation at reduced pressure to yield methyl 3-(p-isopropylphenyl)-3-methylprop-2-enoate.

EXAMPLE 2

A suspension of 600 mg. of 10% palladium on charcoal in 100 ml. of ethyl acetate is pre-hydrogenated. Then a solution containing 6.35 g. of the unsaturated ester of Example 1 in 50 ml. of ethyl acetate is added and hydrogenation continued until the equivalent amount of hydrogen (about 650 ml.) is absorbed. The catalyst is filtered off and the solution is evaporated under reduced pressure to give methyl 3-(p-isopropylphenyl)-3-methylpropanoate.

EXAMPLE 3

To 4.8 g. of the ester of Example 2 in 50 ml. of anhydrous diethyl ether, cooled in a Dry Ice-acetone bath, is added dropwise under nitrogen a solution of 8.23 g. of lithium aluminum hydride in 5.6 ml. of dry diethyl ether and 50 ml. of ether. The mixture is stirred at 0° for 0.5 hour and then at room temperature for three hours. Water (35 ml.) and a 15% aqueous sodium hydroxide solution (10 ml.) are added carefully to the mixture and stirring is continued for ten more minutes. The clear organic layer is decanted and combined with ether backwashings of residue. The ethereal layer is washed with water and brine, dried over calcium sulfate and evaporated to yield 3-(p-isopropylphenyl)-3-methylpropan-1-ol which can be purified by distillation under reduced pressure.

EXAMPLE 4

Chromium trioxide (6.1 g.; 61 mmol) is added to a stirring solution of pyridine (9.48 g.; 120 mmol) and methylene dichloride. The resulting dark brown solution is stirred for 15 minutes. Then a solution of 1.38 g. (7.2 mmol) of the alcohol of Example 3 in 10 ml. of methylene dichloride is added and the mixture is stirred for about two hours. The precipitate formed is allowed to settle, the solution decanted and then combined with the methylene dichloride washings of the residue. The organic solution is filtered through alumina, concentrated under vacuo, diluted with ether and washed with 15% aqueous bicarbonate and brine. Drying over calcium sulfate and evaporation of the solvent affords the aldehyde, 3-(p-isopropylphenyl)-3-methylpropan-1-al.

EXAMPLE 5

Triethyl 4-phosphono-3-methyl-2-butenoate (860 mg.) in 10 ml. of dimethylformamide is added to a solution of 560 mg. of the aldehyde of Example 4 in 15 ml. of dimethylformamide stirring at 0° under nitrogen. After stirring for 0.5 hour, powdered sodium hydroxide (118 mg.) is added in one portion and the mixture is allowed to stir at room temperature for 18 hours. Water and hexane is added, and the organic layer separated, washed with water and brine, dried over calcium sulfate and concentrated in vacuo to yield ethyl 7-(p-isopropylphenyl)-3,7-dimethylhepta-2,4-dienoate (A'; R=ethyl; $R^1$=$R^2$=methyl; $R^3$=p-isopropyl) which is purified by chromatography or silica gel plates eluting with ether:hexane 1:5, followed by short path distillation at reduced pressure.

EXAMPLE 6

Each of m-isopropylacetophenone, p-ethylacetophenone, o-methylacetophenone, p-ethoxyacetophenone, m-methoxyacetophenone, p-hydroxyacetophenone, m-chloroacetophenone, o-mercaptoacetophenone, p-methylthioacetophenone and m-ethylthiophenylacetophenone is used as starting material in the procedure of Example 1 and then subjected to the processes of Examples 2 to 5, to prepare:

ethyl 7-(m-isopropylphenyl)-3,7-dimethylhepta-2,4-dienoate,
ethyl 7-(p-ethylphenyl)-3,7-dimethylhepta-2,4-dienoate,
ethyl 7-(o-methylphenyl)-3,7-dimethylhepta-2,4-dienoate,
ethyl 7-(p-ethoxyphenyl)-3,7-dimethylhepta-2,4-dienoate,
ethyl 7-(m-methoxyphenyl)-3,7-dimethylhepta-2,4-dienoate,
ethyl 7-(p-hydroxyphenyl)-3,7-dimethylhepta-2,4-dienoate,
ethyl 7-(m-chlorophenyl)-3,7-dimethylhepta-2,4-dienoate,
ethyl 7-(o-mercaptophenyl)-3,7-dimethylhepta-2,4-dienoate,
ethyl 7-(p-methylthiophenyl)-3,7-dimethylhepta-2,4-dienoate,
ethyl 7-(m-ethylthiophenyl)-3,7-dimethylhepta-2,4-dienoate.

EXAMPLE 7

Grignard reagents are either commercially available or can be prepared according to standard procedures such as, for example, Vogel, A. I., Textbook of Practical Organic Chemistry, 3rd ed., Wiley, New York, 1966, page 252.

To 2.6 g. of m-ethoxybenzaldehyde in 100 ml. of dry ether, stirring at room temperature under nitrogen, is slowly added a 1.5 M solution of t-butylmagnesium chloride in ether (10 ml.). The mixture is stirred under nitrogen for about two hours, cooled to 0° and treated with saturated aqueous ammonium chloride until reaction subsides. The organic layer is separated and the aqueous layer extracted with ether. The ether extracts and the organic layer are combined, washed with water and brine, and dried over calcium sulfate. Evaporation of the sulfate. Evaporation of the solvent gives 1-(m-ethoxyphenyl)-1-(t-butyl)methanol.

EXAMPLE 8

A solution of 10.3 g. of chromium trioxide in 30 ml. of water and 8.7 ml. of concentrated sulfuric acid is slowly added to a stirred solution of 15 g. of the alcohol of Example 7 in 60 ml. of acetone at 0°–5°. After stirring for an additional 20 minutes, a few drops of isopropyl alcohol is added to the mixture and most of the solvent is evaporated under vacuum. Water is added followed by extraction with ether. The organic layer is washed with water until neutral, dried over calcium sulfate and evaporated to yield m-ethoxyphenyl t-butyl ketone.

EXAMPLE 9

The ketone of Example 8 is used as starting material in the procedure of Example 1 and then consecutively processed according to Examples 2 to 5 to afford ethyl 7-(m-ethoxyphenyl) - 7 - (t-butyl) - 3 - methylhepta-2,4-dienoate (A'; R=ethyl; $R^1$=methyl; $R^2$=t-butyl; $R^3$=m-ethoxy).

EXAMPLE 10 p-Chlorobenzaldehyde is reacted with ethylmagnesium bromide as described in Example 7, the product oxidized as in Example 8 and then condensed with trimethylphosphonoacetate as in Example 1, hydrogenated as in Example 2, reduced as in Example 3, oxidized as in Example 4 and condensed with diethyl 3-methoxycarbonyl-2-ethyl-prop-2-enylphosphonate in place of triethyl 4-phospono-3-methyl - 2 - butenoate as in Example 5, to yield methyl 7-(p-chlorophenyl) - 3,7 - diethylhepta - 2,4 - dienoate (A'; R=methyl; $R^1$=$R^2$=ethyl; $R^3$=p-chloro).

EXAMPLE 11

To 3 g. of ethyl 7-(p-isopropylphenyl)-3,7-dimethylhepta - 2,4 - dienoate in 150 ml. of methanol is added 1.5 g. of potassium hydroxide in 15 ml. of water. The mixture is heated to reflux for about 18 hours. The mixture is then diluted with water, neutralized and extracted with ether. The ether extracts are washed with water dried over calcium sulfate and evaporated to give 7-(p-isopropylphenyl)-3,7-dimethylhepta-2,4-dienoic acid.

EXAMPLE 12

One gram of thionyl chloride is added with stirring at room temperature to 0.5 g. of the acid of Example 11 and the mixture heated at about 50° for 10 minutes. Excess thionyl chloride is removed by evaporation and then benzene (8 ml.) and isopropyl alcohol (2 ml.) is added and the mixture left at room temperature for about one hour. Ether and saturated sodium bicarbonate is added, the organic phase is separated and washed with water and then brine. Drying over magnesium sulfate and evaporation of the solvent yields isopropyl 7-(p-isopropylphenyl)-3,7-dimethylhepta-2,4-dienoate.

By using other alcohols in place of isopropyl alcohol, such as t-butyl alcohol, n-propyl alcohol, ispentyl alcohol, etc. the corresponding esters are prepared.

The effectiveness of the compounds of the present invention is demonstrated below.

The test compound, ethyl 7-(p-isopropylphenyl)-3,7-dimethylhepta - 2,4 - dienoate was applied topically in acetone at concentrations of 1, 0.1 and 0.01 micrograms per microliter to the ventral portion of the abdomen of Galleria mellonella (Lepidoptera) pupae. Ten pupae were used for each dosage level. Control groups of ten pupae were treated similarly with acetone only. The animals were kept in a 31° C. room. Scoring was done after emergence of controls, usually in 7–9 days and expressed as a percentage of unhatched pupae versus the total number of unhatched and hatched normal adults. The juvenile hormone activity is stated in $ID_{50}$ (Inhibition Dose) which is the amount of compound in micrograms resulting in abnormal morphological change in 50% of the specimens treated. The $ID_{50}$ is computed by plotting in semi-logarithmic paper the dose on the horizontal axis against the percentage result on the vertical axis. The intersection of the lines that connect the points at the 50% line indicates the $ID_{50}$ value. For the above-mentioned compound, the $ID_{50}$ in this assay was 0.078 µg.

The activity of ethyl 7-(p-isopropylphenyl) - 3,7 - dimethylhepta - 2,4 - dienoate was also tested on the cynthia silkmoth eggs as follows: Eggs of *Philosamia cynthia* (Lepidoptera) were removed from the colony at the end of each 24 hour period. The eggs were placed on black electrical tape, 15 eggs per tape. The egg tapes were placed in plastic petri dishes and each egg was treated with 1 µl of an acetone solution of the compound. Fifteen eggs were treated per dose level, plus an acetone control. The compound was applied at dose levels of 0.1, 0.01, and 0.001 micrograms per microliter. The eggs were kept at 28° C., 16 hours photoperiod after treatment. After 7 days, moisture was provided to the eggs with a cotton ball saturated with water. After a period of ten days, or when the controls were hatched, the assay was ready for scoring (0=hatched eggs; 1=unhatched eggs) and computing in a similar way to the previous assay. The $ID_{50}$ in the case was 0.0022 µg.

What is claimed is:

1. A compound selected from those of the formula A:

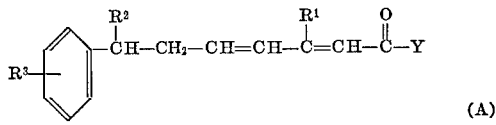

wherein,
each of $R^1$ and $R^2$ is lower alkyl;
$R^3$ is lower alkyl, chloro, the group —OR or the group —SR in which R is hydrogen or lower alkyl; and
Y is the group —OR in which R is hydrogen or lower alkyl.

2. A compound according to Claim 1 wherein
each of $R^1$ and $R^2$ is methy lor ethyl;
$R^3$ is methyl, ethyl, isopropyl, chloro, the group—OR or the group—SR in which R is hydrogen, methyl, ethyl or isopropyl; and
Y is the group—OR in which R is hydrogen, methyl, ethyl or isopropyl.

3. A compound according to Claim 2 wherein $R^3$ is in the meta or para position.

4. A compound according to Claim 3 wherein each of $R^1$ and $R^2$ is methyl, $R^3$ is isopropyl and R is ethyl.

5. The compound, ethyl 7-(p-isopropylphenyl)-3,7-dimethylhepta-2,4-dienoate, according to Claim 4.

References Cited

UNITED STATES PATENTS 3,655,700  4/1972  Siddall _____ 260—405
2,951,853  9/1960  Matsui _____ 260—347.5

OTHER REFERENCES

Chemical Abstracts, vol. 54, 1404c–1406h (1960).

LEWIS GOTTS, Primary Examiner

D. G. RIVERS, Assistant Examiner

U.S. Cl. X.R.

260—399, 408, 413, 470, 473 R, 476 R, 592, 599, 600; 424—318, 312, DIG. 12